Oct. 30, 1956   W. E. CATTERALL   2,768,981
OXO ALCOHOL DISTILLATION PROCESS
Filed July 23, 1953
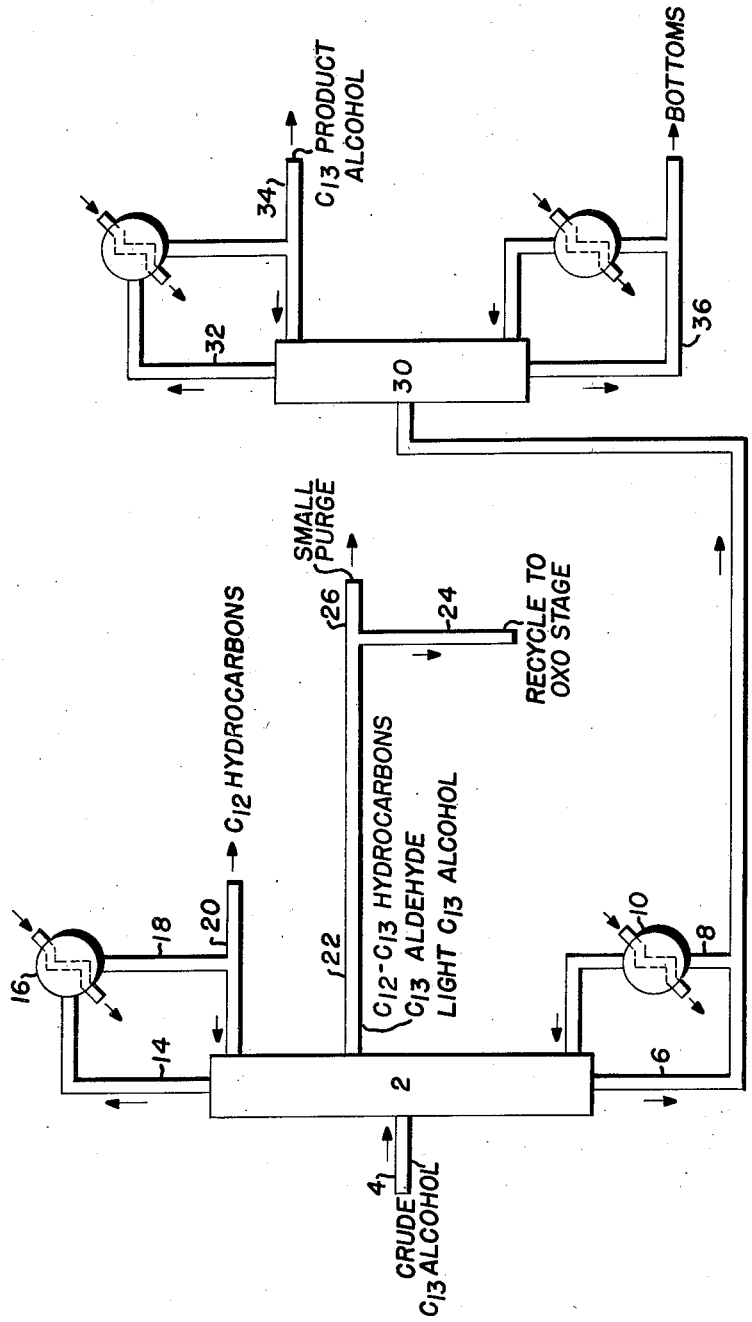
William E. Catterall   Inventor
By *Henry Berk*   Attorney

United States Patent Office 2,768,981
Patented Oct. 30, 1956

2,768,981

OXO ALCOHOL DISTILLATION PROCESS

William E. Catterall, Roselle, N. J., assignor to Esso Research and Engineering Company, a corporation of Delaware Application July 23, 1953, Serial No. 369,752

4 Claims. (Cl. 260—638)

The present invention relates to the preparation of oxygenated organic compounds by the reaction of olefinic carbon compounds with hydrogen and carbon monoxide in the presence of a carbonylation catalyst. More specifically, this invention relates to an improved process for distilling and recovering the alcohol product obtained by hydrogenating the aldehyde formed by the foregoing reaction.

It is now well known in the art that aldehydes and alcohols may be synthesized from olefinic compounds by reaction of the latter with CO and $H_2$ in the presence of a carbonylation catalyst, preferably cobalt, in an essentially three-stage process. In the first stage, the olefinic material, catalyst and synthesis gases are reacted under superatmospheric pressures to give a product consisting predominantly of aldehydes containing one more carbon atom than the olefinic starting material, as well as a certain amount of secondary reaction products, polymeric material and high boiling products. This oxygenated organic mixture, which contains in solution compounds of the metal catalyst, is then generally given a thermal treatment to cause decomposition and removal of the catalystic material from the organic mixture. The catalyst-free material is then hydrogenated at elevated temperatures and pressures in a hydrogenation stage to the corresponding alcohol, and it is to the distillation of this alcohol product produced in the hydrogenation stage that the principal invention relates.

This carbonylation reaction provides a particularly attractive method for preparation of valuable primary alcohols, and substantially all organic compounds having olefinic unsaturation may be employed as feeds.

The catalyst for the first stage of the process is usually added in the form of oil-soluble salts of cobalt, such as cobalt oleate, naphthenate, and the like. However, other forms of cobalt, such as cobalt oxides, water-soluble salts, cobalt carbonyl, and even the metal may be employed, for the active form of the catalyst is probably cobalt hydrocarbonyl, and all other forms of cobalt are converted to this in the course of the reaction.

Synthesis gas is preferably supplied to the first stage in about equimolar proportions of $H_2$ and CO, though the ratio may range from 4/1 to 1/4. The reaction is generally conducted at pressures of from about 2500 to 4500 p. s. i. g. and temperatures of from 250°–400° F.

At the end of the first stage, the aldehyde product containing a high proportion of cobalt carbonyl in solution is passed to a catalyst removal, or clarification, zone, where, in the presence of heat and a gaseous or liquid fluid, the cobalt carbonyl is decomposed and the aldehyde product freed from dissolved catalyst.

The hydrogenation stage may be operated at conventional hydrogenation conditions, including temperatures in the range of 300°–550° F., and pressures of the same order of magnitude as those obtaining in the carbonylation stage. Conventional hydrogenation catalysts include molybdenum sulfide, nickel, copper chromite and the like. The liquid product from the hydrogenation stage is worked up by distillation to separate the desired alsohol product from unconverted feed and secondary reaction products.

A hydrogenation catalyst particularly suitable for this service has been found to be molybdenum sulfide supported on an activated carbon carrier. This catalyst, consisting of about 10% molybdenum sulfide, has been found to be exceptionally rugged and long lived. Furthermore, it is not susceptible to sulfur poisoning nor to poisoning by carbon monoxide, such as would be experienced by the sulfur-sensitive catalysts, such as nickel. However, the molybdenum sulfide catalyst requires somewhat higher temperatures than the sulfur-sensitive catalysts, in the range of about 400°–550° F., preferably 425°–525° F., for attaining its maximum activity. These higher temperatures in the hydrogenation oven favor formation of secondary reaction products, such as aldols, esters, and hydrocarbons resulting from over-hydrogenation. By addition of water to the hydrogenation stage, however, in amounts up to about 10%, the formation of these secondary reaction products is repressed and alcohol selectivity favored.

One of the major problems associated with the distillation and recovery of the alcohol product produced by hydrogenation of the aldehyde product is the fact that in the course of the hydrogenation, particularly at the higher temperature employed with sulfactive catalysts, a significant portion of the alcohol product may be over-hydrogenated to the corresponding paraffin hydrocarbon while another portion of the alcohol product may be dehydrated to the corresponding olefin. In the lower molecular weight ranges, this would only represent a loss of desired alcohol product corresponding to the actual amount of alcohol converted. However, in the higher molecular weight ranges, the separation of these olefinic and paraffinic hydrocarbons by distillation from the alcohol product becomes increasingly difficult, because the differential in boiling range between the hydrocarbon and the alcohol with the same number of carbon atoms continuously decreases.

As an example, $C_{13}$ Oxo alcohol is prepared from a wide-cut dodecene feed having a true boiling range of about 350°–420° F., prepared by polymerization of propylene and/or butylenes. The tridecyl alcohol product has a true boiling range of about 470°–530° F. In carrying out the hydrogenation, a minor amount, in the neighborhood of about 5%, of the potential alcohol product, is converted to hydrocarbon of the same number of carbon atoms as the alcohol product. When molybdenum sulfide supported on active carbon is the hydrogenation catalyst, these hydrocarbons are substantially olefinic and have a boiling range of about 385°–455° F. (mainly $C_{13}$). Presumably these olefins are predominantly derived from dehydration of the $C_{13}$ alcohol, although other side reactions may lead to $C_{13}$ olefins. Thus it is evident that there is only a slight spread of about 15° F. between the hydrocarbon and the alcohol boiling ranges, thus making a distillation split between the two exceptionally difficult.

Furthermore, there is also a considerable azeotropic effect between alcohols and hydrocarbons, increasing the separation difficulties. Conventional operating techniques provide, in the alcohol product separation and recovery stage, a heads tower where hydrocarbons are taken off overhead while the alcohol product and higher boiling secondary reaction products are withdrawn as a bottoms product. In the heads tower, the hydrocarbons strip rather easily and readily from the rich alcohol in the lower part of the tower, due to the azeotropic effect as well as the normal vapor pressure differences. In the upper part of the tower, however, where the hydrocarbons become concentrated, particularly the lighter, i. e., the lower boiling, alcohols tend to be carried overhead azeotropically. This results in an important loss of alcohol product, for its recovery from the overhead fraction is economically unattractive.

Not only is the separation of hydrocarbons from alcohols difficult, particularly in the higher molecular weight ranges, but also the separation of unreduced aldehyde from alcohol product is beset by the same problem. The difference in boiling ranges between the $C_{13}$ aldehydes and $C_{13}$ alcohols is slight, and distillation of alcohol product to separate aldehydes is accompanied by substantial alcohol losses in the overhead. This is particularly true since a number of alcohol and aldehyde isomers are present, and depending on the boiling range of the olefin feed, there may be actual overlapping of alcohol and aldehyde boiling ranges at atmospheric pressure.

In accordance with the present invention, these problems are solved and substantial increases of overall alcohol yield are realized by modifying the heads column to take off a sidestream above the crude alcohol feed point but below the overhead take-off point. While low boiling hydrocarbons formed as a result of product degradation, cracking, disproportionation and the like are withdrawn overhead as heretofore along with unconverted feed hydrocarbons, the intermediate fraction, consisting essentially of olefinic hydrocarbons derived from alcohol dehydration and some aldehyde and alcohol product, is taken off as a sidestream and passed to the primary carbonylation stage for conversion of the olefins to alcohols, and for ultimate recovery of the aldehyde and alcohol content of the stream.

Having set forth its general nature, the invention will best be understood from the following more detailed description in which reference will be made to the accompanying drawing. Since the invention relates specifically to the crude alcohol distillation stage, and since the carbonylation or Oxo and aldehyde hydrogenation stages are conventional and their operation well known to those skilled in the art, these features, for simplicity, have been omitted from the drawing.

Turning now to the drawing, crude alcohol product prepared as outlined above is passed to an intermediate portion of heads tower 2 through line 4. For the purpose of the illustration, the crude alcohol is prepared by oxonating $C_{12}$ olefins, and thus the feed introduced into tower 2 consists primarily of primary tridecyl alcohols contaminated with varying amounts of $C_{12}$ olefins and paraffins, $C_{13}$ olefins, and paraffins, unreacted $C_{13}$ aldehydes, degradation products having less than 12 carbon atoms, and secondary reaction products having more than 13 carbon atoms, such as esters, acetals, condensation products and the like. It is to be understood that other crude alcohol mixtures obtained by oxonation of olefins may also be used, particularly if derived from the olefins having 9 or more carbon atoms.

Overhead through line 14 there is withdrawn a stream comprising low boiling olefins and paraffins, i. e., those having 12 carbon atoms and less. This stream has a boiling range no higher than the olefin stream originally fed to the aldehyde synthesis reactor (not shown). The overhead stream is passed through condenser 16 and a portion passed as reflux to the upper portion of tower 2; the balance is withdrawn through line 20 and may be used as a fuel blending agent.

As a bottoms product there is withdrawn through line 6 a stream consisting essentially of compnds boiling in the range of primary tridecyl alcohols, along with a minor proportion of higher boiling secondary reaction products. A portion of this stream is passed through line 8 to reboiler 10 to supply heat to the bottom of the tower. The remainder is passed to alcohol finishing still 30, where the refined $C_{13}$ alcohol is recovered as an overhead stream through lines 32 and 34, while the high boiling secondary reaction products are withdrawn as a bottoms stream through line 36.

Returning to still 2, the latter is operated such that a side stream comprising a mixture of $C_{12}$ and $C_{13}$ hydrocarbons, which may be olefinic, paraffinic, and usually both, is withdrawn through line 22. This sidestream contains not only the $C_{13}$ olefins resulting from alcohol dehydration, but also substantially all of the aldehydes present in the feed and a portion of the lower boiling tridecyl alcohol fraction. In accordance with the present invention this sidestream is passed to the aldehyde synthesis reactor through line 24. There is thus achieved the ultimate recovery of both the aldehyde and the alcohol content; the olefin resulting from dehydration being converted by the Oxo reaction whereas the recycled alcohol being recovered eventually unchanged and the recycled aldehyde converted to alcohol. The $C_{13}$ olefins resulting from the dehydration of alcohol and formed in the hydrogenation stage are particularly valuable as supplementary feed stock because they are mainly alpha olefins, which undergo the Oxo reaction very readily. Such olefins can be oxonated at practically 100% conversion, whereas the original feedstock may give only 50% conversion due to the presence of relatively unreactive isomers. These supplementary alcohols have one more carbon atom than the principal alcohols and produce a blend having desirable properties, particularly as detergents on sulfation or oxethylation. $C_{14}$ hydrocarbons resulting from dehydration and overhydrogenation of these higher alcohols will be formed in only very small amounts, i. e., about 0.25% on total product alcohol, based on 5% degradation of alcohol to hydrocarbon of the same number of carbon atoms. The bulk of even these $C_{14}$ hydrocarbons are found in the sidestream 22 rather than in the bottoms product withdrawn through line 6 because they strip with abnormally high relative volatility from the alcohol-rich bottoms stream.

A small purge of the recycle stream through line 26 suffices to avoid buildup of paraffins and other unreactive constituents in the sidestream boiling range.

Temperature conditions can be established over a wide range in the fractionating columns by appropriate selection of absolute pressure of operation. The bottoms fraction normally contains aldehyde derivations and other materials which are thermally unstable. Thermal decomposition of such materials leads to contamination of the product alcohol with decomposition products. Therefore it is normally desirable when producing alcohol of highest quality to resort to vacuum distillation. Low tower holdup also is advantageous.

In addition to the factor of thermal stability, there is another factor which strongly favors the use of vacuum distillation. The relative volatilities in the heads tower are improved as the temperature of distillation is reduced. This results from the fact that the vapor pressure-temperature slopes for the various chemical types are different, and both the hydrocarbons and aldehydes show increased volatilities at lower temperatures relative to alcohols containing the same number of carbon atoms. Other methods of reducing distillation temperature such as steam or inert gas injection will be apparent to those skilled in the art.

Typical distillation conditions which may be used for the finishing of $C_{13}$ Oxo alcohol are given in the following table. In the table the light ends tower corresponds to still 2 in the drawing while the alcohol tower is designated by still 30 in the drawing.

| Tower | Light Ends | Alcohol |
|---|---|---|
| Number of actual plates | 30 | 12 |
| Feed plate location (from bottom) | 15 | 6 |
| Sidestream location (from bottom) | 24 | |
| Pressures, mm. Hg absolute: | | |
| Top | 460 | 140 |
| Bottom | 640 | 210 |
| Temperature, °F.: | | |
| Top | 340 | 390 |
| Sidestream | 400 | |
| Bottom | 500 | 500 |
| Yields, vol. percent on crude alcohol: | | |
| Overhead | 38 | 36 |
| Sidestream | 10 | |
| Bottoms | 52 | 16 |

The crude alcohol in the above example would be typically derived from $C_{12}$ polypropylene with about 50% conversion of feed to oxygenated derivatives in the oxonation stage, and with the following selectivities after hydrogenation:

|  | Percent |
|---|---|
| $C_{13}$ hydrocarbon (mainly olefinic) | 5 |
| $C_{13}$ alcohol | 75 |
| Bottoms | 20 |

This invention is not restricted to $C_{13}$ alcohol, but obviously it is particularly valuable with relatively high molecular weight alcohols where there is only a small spread in boiling point between hydrocarbons and alcohols having the same number of carbon atoms. It is also particularly valuable in this range because here also there is very little spread between aldehyde and alcohol boiling range. In order to produce alcohol of adequate purity, severe hydrogenation may be required, in which case the product losses due to alcohol dehydration and overhydrogenation will be severe unless this invention is practiced. Furthermore, this invention will allow maximum separation of aldehyde by distillation without alcohol loss. Considerable alcohol may be taken in the sidestream to effect maximum aldehyde elimination from the alcohol bottoms by distillation, but this alcohol will ultimately be recovered almost completely. The aldehyde itself, of course, will be recovered also. The advantage of this system in aldehyde elimination without alcohol loss may be important enough to cause its use even when the hydrocarbons from overhydrogenation are paraffinic rather than olefinic as they may be with certain hydro catalysts.

What is claimed is:

1. In the process wherein feed olefins having at least about nine carbon atoms are reacted at elevated temperatures and pressures with CO and $H_2$ and a carbonylation catalyst in a carbonylation zone to form an aldehyde product having at least one more carbon atom than said feed olefins, and wherein said aldehyde product is further reacted in a hydrogenation zone under hydrogenation conditions in the presence of a sulfactive hydrogenation catalyst at maximum activity temperatures to form a crude alcohol product containing alcohols and olefins having at least one more carbon atom than said feed olefins, and said alcohol product is recovered and purified, the improvement which comprises passing said crude alcohol product to an initial distillation zone, taking overhead a fraction boiling no higher than the boiling point of said first-named feed olefins, withdrawing from said distillation zone at a point below the overhead take-off point but above the crude alcohol injection point a fraction boiling above the boiling point of said first-named feed olefins but below the boiling point of the bulk of the alcohol forming said crude alcohol fraction, withdrawing as a bottoms product the bulk of said alcohol product and passing at least a portion of said intermediate fraction back to said carbonylation zone.

2. The process of claim 1 wherein said olefinic compounds are essentially dodecylenes, and said intermediate fraction comprises tridecylenes, tridecyl aldehydes, and relatively low boiling primary tridecyl alcohols.

3. The process of claim 1 wherein said distillation is carried out under a diminished pressure.

4. The process of claim 1 wherein said hydrogenation catalyst is a sulfactive catalyst.

References Cited in the file of this patent

UNITED STATES PATENTS

| 2,595,763 | Carlson et al. | May 6, 1952 |
| 2,638,487 | Russum et al. | May 12, 1953 |